(12) United States Patent
Li et al.

(10) Patent No.: US 9,863,599 B2
(45) Date of Patent: Jan. 9, 2018

(54) LIGHTING DEVICE

(71) Applicant: BOE TECHNOLOGY GROUP CO., LTD., Beijing (CN)

(72) Inventors: Wenbo Li, Beijing (CN); Yanbing Wu, Beijing (CN); Yefei Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 217 days.

(21) Appl. No.: 14/443,715

(22) PCT Filed: Oct. 1, 2014

(86) PCT No.: PCT/CN2014/088081
§ 371 (c)(1),
(2) Date: May 19, 2015

(87) PCT Pub. No.: WO2015/192544
PCT Pub. Date: Dec. 23, 2015

(65) Prior Publication Data
US 2016/0178157 A1 Jun. 23, 2016

(30) Foreign Application Priority Data
Jun. 19, 2014 (CN) .......................... 2014 1 0276910

(51) Int. Cl.
*F21V 3/04* (2006.01)
*G02F 1/1334* (2006.01)
(Continued)

(52) U.S. Cl.
CPC .......... *F21V 3/0409* (2013.01); *F21V 14/003* (2013.01); *F21V 23/003* (2013.01);
(Continued)

(58) Field of Classification Search
CPC .... F21V 3/0409; F21V 14/003; F21V 23/003; G02F 1/1334
See application file for complete search history.

(56) References Cited

U.S. PATENT DOCUMENTS

| 7,119,484 B2 | 10/2006 | Damm et al. |
| 2002/0005695 A1 | 1/2002 | Ichibakase et al. |
| 2002/0071069 A1* | 6/2002 | Nakagawa ............ G02F 1/1334 349/86 |

FOREIGN PATENT DOCUMENTS

| CN | 2038863 U | 6/1989 |
| CN | 2218872 Y | 1/1996 |

(Continued)

OTHER PUBLICATIONS

Second Chinese Office Action in Chinese Application No. 201410276910.2 dated Oct. 11, 2016 with English translation.
(Continued)

*Primary Examiner* — Mary Ellen Bowman
(74) *Attorney, Agent, or Firm* — Collard & Roe, P.C.

(57) ABSTRACT

The present invention discloses a lighting device provided with an electronic lamp cover (30) surrounding a light emitting component (20). The electronic lamp cover (30) can present different light transmitting states according to different voltage values applied thereto within an operation voltage range so as to change the illumination angle and illumination brightness of the illumination light of the lighting device.

14 Claims, 3 Drawing Sheets

(51) Int. Cl.
  *F21V 23/00* (2015.01)
  *F21V 14/00* (2006.01)
  *F21Y 115/15* (2016.01)
  *F21Y 115/10* (2016.01)

(52) U.S. Cl.
  CPC ......... *G02F 1/1334* (2013.01); *F21Y 2115/10* (2016.08); *F21Y 2115/15* (2016.08)

(56) References Cited

FOREIGN PATENT DOCUMENTS

| | | |
|---|---|---|
| CN | 1384310 A | 12/2002 |
| CN | 1523637 A | 8/2004 |
| CN | 201014392 Y | 1/2008 |
| CN | 201141550 Y | 10/2008 |
| CN | 201203051 Y | 3/2009 |
| CN | 101446392 A | 6/2009 |
| CN | 201474532 U | 5/2010 |
| CN | 201475874 U | 5/2010 |
| CN | 102702713 A | 10/2012 |
| CN | 203375252 U | 1/2014 |
| JP | H04-133204 A | 5/1992 |
| JP | 2012-137620 A | 7/2012 |

OTHER PUBLICATIONS

International Search Report of PCT/CN2014/088081 in Chinese with English translation, dated Mar. 23, 2015.
Notice of Transmittal of the International Search Report of PCT/CN2014/088081 in Chinese, dated Mar. 24, 2015.
Written Opinion of the International Searching Authority of PCT/CN2014/088081 in Chinese with English translation, dated Mar. 23, 2015.
Chinese Office Action in Chinese Application No. 201410276910.2 dated May 31, 2016 with English translation.
Third Chinese Office Action in Chinese Application No. 201410276910.2 dated Feb. 28, 2017 with English translation.
Fourth Chinese Office Action in Chinese Application No. 201410276910.2 dated Jul. 17, 2017 with English translation.

* cited by examiner

LIGHTING DEVICE

CROSS REFERENCE TO RELATED APPLICATIONS

This application is the National Stage of PCT/CN2014/088081filed on Oct. 1, 2014, which claims priority under 35 U.S.C. §119 of Chinese Application No. 201410276910.2 filed on Jun. 19, 2014, the disclosure of which is incorporated by reference.

TECHNICAL FILED

Embodiments of the present invention relate to a lighting device.

BACKGROUND

Illuminator, as a daily consumable product, has been significantly developed with the economic and social progress and the appearance of fluorescent lamps, energy saving lamps, LED lamps and other new light sources. Various types of light sources to be selected indicate that the development of lighting industry has launched a new age. City squares, roads, new communities, home decorations, malls and office buildings all need lighting products for decoration, and present customized requirements thereto.

SUMMARY

Embodiments of the present invention provide a lighting device, comprising: a support; a light emitting component mounted on the support; and an electronic lamp cover mounted on the support to surround the light emitting component; wherein the electronic lamp cover presents different light transmitting states upon being applied with different voltage values within an operation voltage range.

In one example, a light transmittance of the electronic lamp cover increases with the voltage value applied thereto within the operation voltage range.

In one example, the electronic lamp cover comprises: two layers of electrodes opposite to each other; an electro-variable light transmittance layer disposed between the two layers of electrodes; and a voltage controlling circuit configured to control a voltage difference between the two layers of electrodes.

In one example, the electro-variable light transmittance layer is made of a material of photoelectric crystal or polymer liquid crystal.

In one example, the photoelectric crystal is $KH_2PO_4$, $NH_4H_2PO_4$, $KH_2AsO_4$ or $KD_2PO_4$.

In one example, the polymer liquid crystal is a polymer-dispersed liquid crystal or a polymer-cholesteric phase liquid crystal.

In one example, the light emitting component is a LED lamp or an OLED lamp.

In one example, a light emitting controlling circuit that controls the LED lamp or the OLED lamp to emit light and the voltage controlling circuit that controls the voltage difference between the two layers of electrodes in the electronic lamp cover are integrated on the same circuit board.

In one example, the lighting device further comprises: a strip grating disposed between the electronic lamp cover and the light emitting component; and an adjusting device configured to adjust an emergence angle of light at a light transmitting region of the strip grating.

DETAILED DESCRIPTION OF THE PREFERRED EMBODIMENTS

Figure 1:
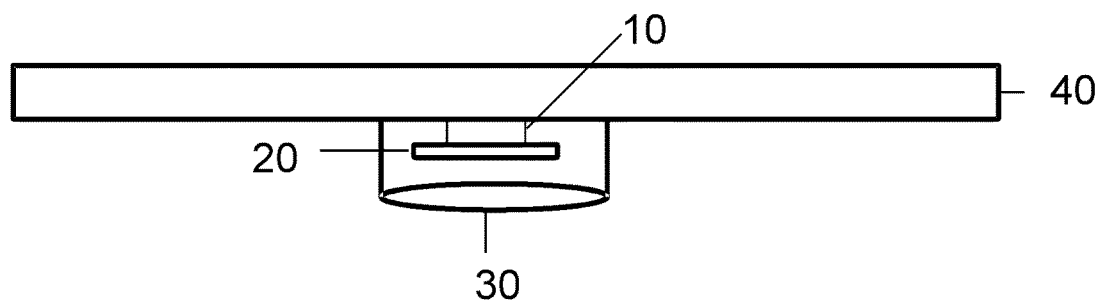
FIG. 1 is a schematically structural view of a lighting device according to an embodiment of the present invention.

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Shapes and sizes of components in the drawings are not intended to reflect a real scale of the lighting device but to illustrate the content of the present invention only.

The inventor recognizes that the current lighting products always can only implement general illumination function but cannot change the illumination angle and the illumination brightness of the illumination light.

As illustrated in FIG. 1, an embodiment of the present invention provides a lighting device, comprising: a support 10; a light emitting component 20 mounted on the support 10; and an electronic lamp cover 30 mounted on the support 10 to surround the light emitting component 20; wherein the electronic lamp cover 30 presents different light transmitting states when applied with different voltage values within an operation voltage range.

In this embodiment, the lighting device is described as a ceiling lamp for purpose of illustration. For example, as illustrated in FIG. 1, the lighting device can be fixed on a ceiling 40 by using the support 10 of the lighting device. Certainly, the lighting device according to this embodiment can also be a wall lamp and the like, without limiting the scope of the present invention.

The above-mentioned lighting device according to embodiments of the present invention is provided with an electronic lamp cover 30 surrounding the light emitting component 20. The electronic lamp cover 30 can present different light transmitting states according to different voltage values applied thereto within an operation voltage range, so as to change the illumination angle and illumination brightness of the illumination light of the lighting device. For example, when the electronic lamp cover 30 presents a transparent state, the light emitted from the light emitting component 20 can directly pass there-through to form light with specific illumination angle and certain illumination brightness. When the electronic lamp cover 30 presents a scattering state, the light emitted from the light emitting component 20 is partly refracted at the electronic lamp cover 30 to form light scattering in all directions with certain illumination brightness. The above-mentioned lighting device according to the embodiment of the present invention can change the illumination angle and illumination brightness of the light thereof by adjusting the light transmitting state of the electronic lamp cover 30.

Figure 2:
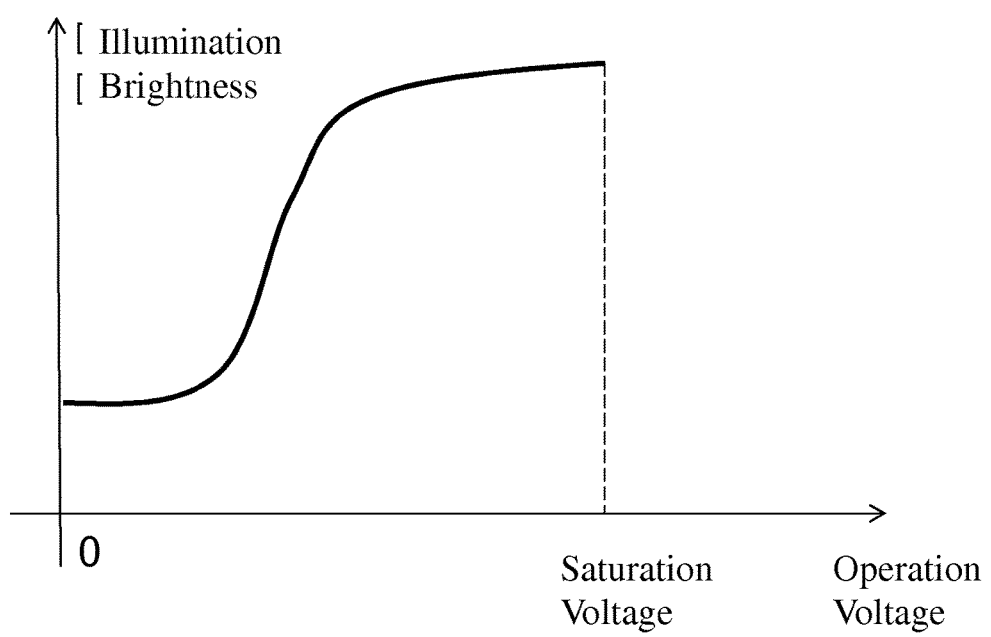
FIG. 2 is a curve graph illustrating an operation voltage versus an illumination brightness of the lighting device according to an embodiment of the present invention.

In the above-mentioned lighting device according to embodiments of the present invention, the light transmitting state of the electronic lamp cover 30 can be changed with the voltage applied thereto. The light transmittance of the electronic lamp cover 30 increases with the voltage value applied thereto within the operation voltage range; and the higher the light transmittance of the electronic lamp cover 30 is, the greater the illumination brightness of the lighting device will be. As illustrated in FIG. 2, a correspondence between the operation voltage of the electronic lamp cover 30 and the illumination brightness of the lighting device can be established. For example, the electronic lamp cover 30 has a fixed saturation voltage depending on the structure thereof; the light transmittance of the electronic lamp cover 30 can reach a maximum value typically of about 80%-90% when the saturation voltage is applied thereto and has a minimum value when no voltage is applied thereto. Therefore, it's possible to predetermine the operation voltage range of the electronic lamp cover 30 according to the saturation voltage thereof and to select the operation voltage applied to the electronic lamp cover 30 within the operation voltage range, so as to ensure a longer service life of the electronic lamp cover 30.

Figure 3A:
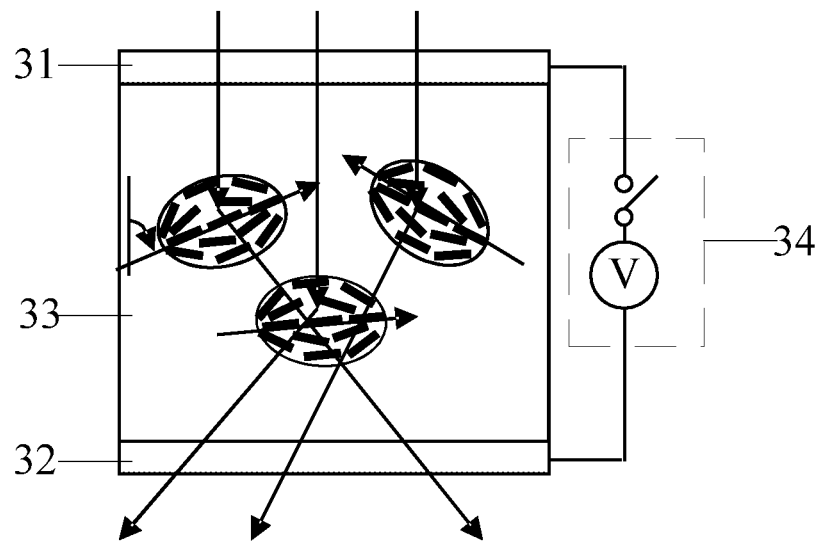
FIGS. 3a and 3b are schematic diagrams illustrating operation state of an electronic lamp cover in the lighting device according to an embodiment of the present invention, respectively.
Figure 3B:
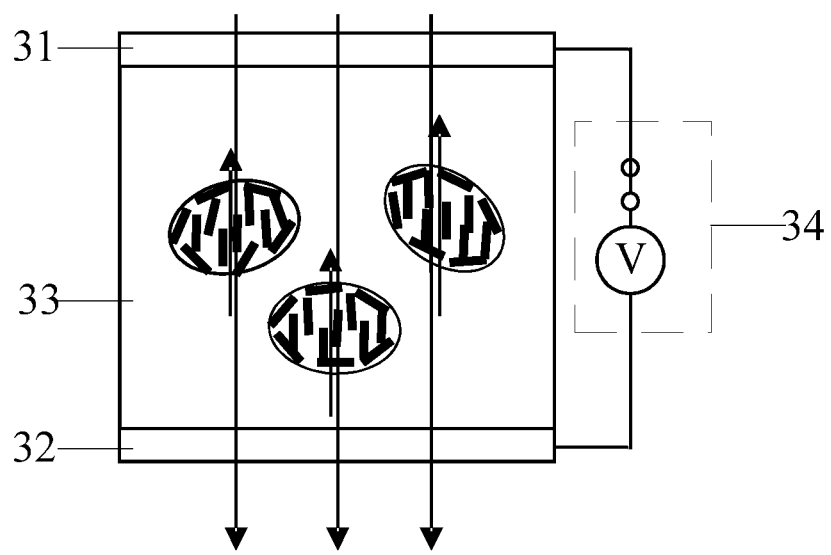

An exemplary structure of the electronic lamp cover 30 with its light transmittance being adjustable by applying different voltages thereto is illustrated in FIG. 3a and FIG. 3b, comprising: two layers of electrodes 31 and 34 opposite to each other; an electro-variable light transmittance layer 33 disposed between the two layers of electrodes 31 and 32; and a voltage controlling circuit 34 configured to control a voltage difference between the two layers of electrodes 31 and 32. When the electronic lamp cover 30 is in operation, the voltage difference between the two layers of electrodes 31 and 32 is controlled by using the voltage controlling circuit 34, so as to change the light transmittance of the electro-variable light transmittance layer 33 and hence to adjust the illumination brightness of the lighting device.

For example, the electro-variable light transmittance layer of the electronic lamp covers 30 is made of a material selected from photoelectric crystal and polymer liquid crystal, etc., of which an alignment of molecules can be changed according to the voltage applied thereto, so as to affect the path of the transmitted light and hence to adjust the light transmittance.

The photoelectric crystal can comprise $KH_2PO_4$ (KDP), $NH_4H_2PO_4$ (ADP), $KH_2AsO_4$ (KDA), $KD_2PO_4$ (KD*P) and the like.

The polymer liquid crystal can comprise polymer-dispersed liquid crystal and polymer-cholesteric phase liquid crystal and the like.

FIG. 3a and FIG. 3b are illustrated with the polymer-dispersed liquid crystal as the material forming the electro-variable light transmittance layer 33. It can be seen that, in the case where no voltage is applied to the electronic lamp cover 30 as illustrated in FIG. 3a, polymer-dispersed liquid crystals are randomly aligned such that the incident light is emergent in scattering state (indicated by the arrow in the figure) and the intensity of the incident light is more or less reduced after passing there though; therefore, the lighting device ultimately emits light scattering in all directions with partial illumination brightness. In the case where the saturation voltage is applied to the electronic lamp cover 30 as illustrated in FIG. 3b, polymer-dispersed liquid crystals are orderly aligned such that the incident light directly passes there through (indicated by the arrow in the figure) and the intensity of the incident light keeps substantially unchanged after passing there though; therefore, the lighting device ultimately emits light with specific illumination angle and full illumination brightness.

In the above-mentioned lighting device according to embodiments of the present invention, the light emitting component 20 can be new type of lamps such as a LED lamp or an OLED lamp or can be conventional lamps such as a filament lamp, without limiting the scope of the present invention. For the LED lamp or the OLED lamp, a driving voltage thereof typically has a constant value, and it is usually very difficult to change the illumination brightness of the lamp by conventionally changing a resistance; however, the illumination brightness of the above-mentioned lamp can be changed conveniently by utilizing the electronic lamp cover 30 of the above-mentioned lighting device according to embodiments of the present invention.

For example, in the lighting device according to embodiments of the present invention, it needs to control both the electronic lamp cover 30 and the LED lamp or OLED lamp by using a circuit, thus a light emitting controlling circuit that controls the LED lamp or the OLED lamp and a voltage controlling circuit 34 that controls the voltage difference between the two layers of electrodes of the electronic lamp cover can be integrated on the same circuit board, in order to save space and cost.

Figure 4A:
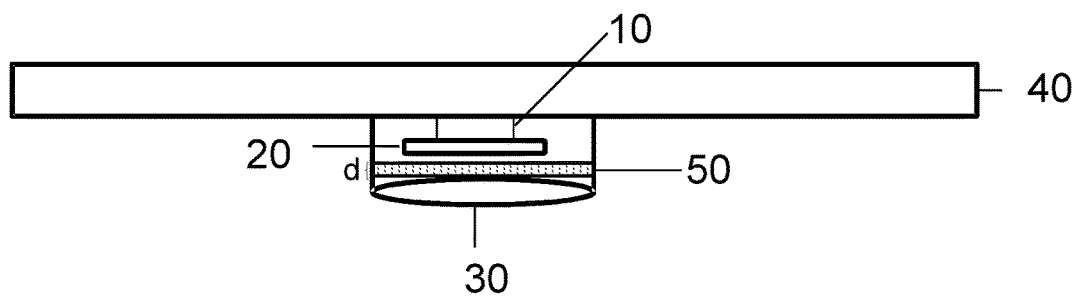
FIGS. 4a and 4b are schematic views illustrating a structure of the lighting device according to an embodiment of the present invention, respectively.
Figure 4B:
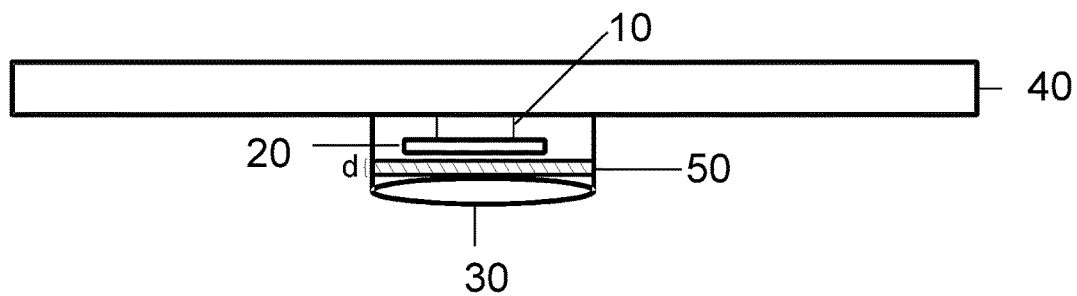

For example, as illustrated in FIG. 4a and FIG. 4b, the above-mentioned lighting device according to embodiments of the present invention can further comprise: a strip grating 50 disposed between the electronic lamp cover 30 and the light emitting component 20; and an adjusting device configured to adjust an emergent angle of light at a light transmitting region of the strip grating 50 (not illustrated in the figures); in order to adjust the emergent angle of light emitted from the light emitting component 20 in the lighting device more significantly.

When the above-mentioned lighting device according to embodiments of the present invention is in operation, the emergent angle of light at the light transmitting region of the strip grating 50 can be adjusted according to actual requirements by using the adjusting device; for example, the emergent angle of light at the light transmitting region of the strip grating 50 is changed from a vertical direction as illustrated in FIG. 4a to an inclined direction as illustrated in FIG. 4b so that the illumination angle of light emitted from the light emitting component 20 changes with the emergent angle of light at the light transmitting region, so as to achieve different, directional illumination functions of the lighting device.

For example, the strip grating 50 of the above-mentioned lighting device according to embodiments of the present invention generally has a certain thickness of d so as to conveniently change the emergent angle of light at the light transmitting region. For example, the strip grating 50 can be an active grating such as a liquid crystal grating or can be a strip grating consisted of blades connecting through a revolving shaft, without limiting the scope of the present invention.

The above-mentioned lighting device according to embodiments of the present invention comprises an electronic lamp cover surrounding the light emitting component. The electronic lamp cover can present different light transmitting states according to different voltage values applied thereto within a predetermined operation voltage range, so as to change the illumination angle and illumination brightness of the illumination light of the lighting device. For example, when the electronic lamp cover presents a transparent state, the light emitted from the light emitting component can directly pass there through to form light with specific illumination angle and certain illumination brightness; when the electronic lamp cover presents a scattering state, the light emitted from the light emitting component is partly refracted at the electronic lamp cover to form light scattering in all directions with certain illumination brightness. Therefore, the above-mentioned lighting device according to embodiments of the present invention can change the illumination angle and illumination brightness of the illumination light by adjusting the light transmitting state of the electronic lamp cover.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present invention claims priority of Chinese patent application No. 201410276910.2 filed on Jun. 19, 2014 titled "Lighting Device", which is incorporated herein by reference in its entirely.

What is claimed is:

1. A lighting device, comprising: a support; a light emitting component mounted on the support; and an electronic lamp cover mounted on the support to surround the light emitting component;
wherein the electronic lamp cover presents different light transmitting states upon the electronic lamp cover being applied with different voltage values within an operation voltage range,
wherein the electro-variable light transmittance layer is made of a material of photoelectric crystal, and the photoelectric crystal comprises $KH_2PO_4$, $NH_4H_2PO_4$, $KH_2AsO_4$ and $KD_2PO_4$.

2. The lighting device of claim 1, wherein a light transmittance of the electronic lamp cover increases with the voltage value applied thereto within the operation voltage range.

3. The lighting device of claim 1, wherein the electronic lamp cover comprises: two layers of electrodes opposite to each other; an electro-variable light transmittance layer disposed between the two layers of electrodes; and a voltage controlling circuit configured to control a voltage difference between the two layers of electrodes.

4. The lighting device of claim 1, wherein the light emitting component comprises LED lamp and OLED lamp.

5. The lighting device of claim 3, wherein a light emitting controlling circuit that controls the light emitting component and the voltage controlling circuit that is configured to control the voltage difference between the two layers of electrodes of the electronic lamp cover are integrated on a same circuit board.

6. The lighting device of claim 1, further comprising: a strip grating disposed between the electronic lamp cover and the light emitting component; and an adjusting device configured to adjust an emergent angle of light at a light transmitting region of the strip grating.

7. The lighting device of claim 2, wherein the electronic lamp cover comprises: two layers of electrodes opposite to each other; an electro-variable light transmittance layer disposed between the two layers of electrodes; and a voltage controlling circuit configured to control a voltage difference between the two layers of electrodes.

8. The lighting device of claim 7, wherein the electro-variable light transmittance layer is made of a material of photoelectric crystal or polymer liquid crystal.

9. The lighting device of claim 8, wherein the photoelectric crystal comprises $KH_2PO_4$, $NH_4H_2PO_4$, $KH_2AsO_4$ and $KD_2PO_4$.

10. The lighting device of claim 7, wherein a light emitting controlling circuit that controls the light emitting component and the voltage controlling circuit that is configured to control the voltage difference between the two layers of electrodes of the electronic lamp cover are integrated on a same circuit board.

11. The lighting device of claim 2, further comprising: a strip grating disposed between the electronic lamp cover and the light emitting component; and an adjusting device configured to adjust an emergent angle of light at a light transmitting region of the strip grating.

12. The lighting device of claim 3, further comprising: a strip grating disposed between the electronic lamp cover and the light emitting component; and an adjusting device configured to adjust an emergent angle of light at a light transmitting region of the strip grating.

13. The lighting device of claim 1, further comprising: a strip grating disposed between the electronic lamp cover and the light emitting component; and an adjusting device configured to adjust an emergent angle of light at a light transmitting region of the strip grating.

14. The lighting device of claim 5, further comprising: a strip grating disposed between the electronic lamp cover and the light emitting component; and an adjusting device configured to adjust an emergent angle of light at a light transmitting region of the strip grating.

* * * * *